United States Patent
Yoon

(10) Patent No.: US 9,313,362 B2
(45) Date of Patent: Apr. 12, 2016

(54) SYSTEM AND METHOD OF DELIVERING PROCESSED IMAGE DATA TO RECEIVER USING JOB PROCESSING INFORMATION PROVIDED TO AN IMAGE FORMING APPARATUS

(75) Inventor: Ha-young Yoon, Hwaseong-si (KR)

(73) Assignee: SAMSUNG ELECTRONICS CO., LTD., Suwon-Si (KR)

(*) Notice: Subject to any disclaimer, the term of this patent is extended or adjusted under 35 U.S.C. 154(b) by 767 days.

(21) Appl. No.: 12/099,265

(22) Filed: Apr. 8, 2008

(65) Prior Publication Data

US 2009/0021781 A1 Jan. 22, 2009

(30) Foreign Application Priority Data

Jul. 19, 2007 (KR) .................. 10-2007-0072470

(51) Int. Cl.
*G06F 3/12* (2006.01)
*H04N 1/32* (2006.01)
*H04N 1/00* (2006.01)
*G06K 15/00* (2006.01)

(52) U.S. Cl.
CPC .......... *H04N 1/32502* (2013.01); *G06F 3/1296* (2013.01); *H04N 1/00209* (2013.01); *H04N 1/00225* (2013.01); *H04N 1/00957* (2013.01); *H04N 1/32529* (2013.01); *G06F 3/1297* (2013.01); *G06K 15/00* (2013.01); *H04N 2201/0082* (2013.01); *H04N 2201/0094* (2013.01); *H04N 2201/3205* (2013.01); *H04N 2201/3208* (2013.01)

(58) Field of Classification Search
USPC .............. 358/1.15, 401, 402, 1.13, 1.16, 407, 358/442; 399/82
See application file for complete search history.

(56) References Cited

U.S. PATENT DOCUMENTS 6,459,499 B1    10/2002   Tomat
7,324,223 B1*   1/2008   Mori ............................ 358/1.15
(Continued)

FOREIGN PATENT DOCUMENTS

CN    1496078    5/2004
CN    1649382    8/2005
(Continued)

OTHER PUBLICATIONS

CN Office Action issued Nov. 22, 2011 in CN Patent Application No. 200810095976.6.
(Continued)

*Primary Examiner* — Vu B Hang
(74) *Attorney, Agent, or Firm* — Staas & Halsey LLP

(57) ABSTRACT

A system and method of transmitting data to each of a plurality of receivers using job processing information regarding image forming jobs sets one or more destinations corresponding to a receiver, generates job processing information including information on the destination of the receiver to which jobs are to be transmitted, and transmitting completed jobs to the one or more destinations corresponding to the receiver using the generated job processing information. Accordingly, when processing information is generated for a particular image forming job, the locations of receivers receiving a document can be designated using only names of the receivers, and without detailed information address information regarding the receivers. Additionally, the destinations can be associated with job processing variables such as transmitters and document formats.

15 Claims, 8 Drawing Sheets

(56) References Cited

U.S. PATENT DOCUMENTS

| | | | |
|---|---|---|---|
| 7,382,473 B2* | 6/2008 | Chohsa et al. | 358/1.13 |
| 7,523,073 B2* | 4/2009 | Nomura et al. | 705/400 |
| 7,532,340 B2* | 5/2009 | Koppich et al. | 358/1.15 |
| 7,647,377 B2 | 1/2010 | Yamade | |
| 7,852,497 B2* | 12/2010 | Sato | 358/1.13 |
| 2001/0015823 A1* | 8/2001 | Sato | 358/1.15 |
| 2002/0171868 A1* | 11/2002 | Yoshimura et al. | 358/1.15 |
| 2004/0136023 A1 | 7/2004 | Sato | |
| 2006/0150152 A1* | 7/2006 | Soini et al. | 717/116 |
| 2007/0019229 A1* | 1/2007 | Matsuhara | 358/1.15 |
| 2007/0089173 A1 | 4/2007 | Hikichi et al. | |
| 2011/0002011 A1 | 1/2011 | Endo | |

FOREIGN PATENT DOCUMENTS

| | | |
|---|---|---|
| CN | 1941824 | 4/2007 |
| CN | 1984212 | 6/2007 |
| JP | 11-146007 | 5/1999 |
| JP | 2000-224357 | 8/2000 |
| JP | 2002-269015 | 9/2002 |
| JP | 2006-254353 | 9/2006 |

OTHER PUBLICATIONS

Chinese Office Action Issued on Aug. 31, 2012 in CN Application No. 200810095976.6.

Korean Office Action issued in Application No. 10-2007-0072470 dated Dec. 24, 2012.

Chinese Office Action issued in Application No. 200810095976.6 dated Feb. 1, 2013.

* cited by examiner

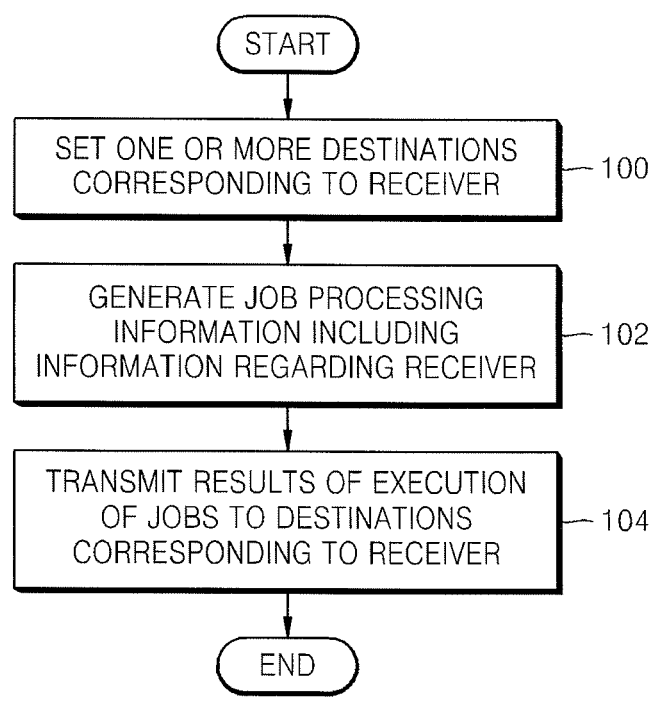

FIG. 4

SETTING ACCORDING TO TRANSMITTERS | SETTING ACCORDING TO FILE FORMATS

- TRANSMITTER LIST

| NO | TRANSMITTER ID | TRANSMITTER NAME |
|----|----------------|-------------------|
| 1  | km23           | KIM MYEONG SEU    |
| 2  | jhyoung        | JO HYEONG YEONG   |
| 3  | yk2513         | PARK SEONG JIN    |

- RECEIVING DESTINATION LIST OF RECEIVER

| LIST          | SUMMARY INFORMATION       |
|---------------|---------------------------|
| FIRST E-MAIL  | twins@mail.net            |
| FTP1          | 10.88.193.22              |
| FIRST FOLDER  | ₩₩10.88.195.55₩share1     |
| SECOND E-MAIL | twins@email.com           |

[DELETE] [REVISE] [ADD]

- RECEIVING DESTINATIONS ACCORDING TO TRANSMITTERS

| NO | TRANSMITTER ID | LIST          | PRIORITY |
|----|----------------|---------------|----------|
| 1  | km23           | FTP1          | 1        |
| 2  |                | FIRST FOLDER  | 1        |
| 3  |                | SECOND E-MAIL | 1        |
| 4  | jhyoung        | FIRST E-MAIL  | 1        |
| 5  |                | SECOND E-MAIL | 2        |
| 6  |                | FIRST FOLDER  | 3        |
| 7  | yk2513         | FTP1          | 1        |
| 8  | ETC            | FIRST E-MAIL  | 1        |
| 9  |                | SECOND E-MAIL | 2        |

[DELETE] [ADD]

FIG. 5

| SETTING ACCORDING TO TRANSMITTERS | SETTING ACCORDING TO FILE FORMATS | |
|---|---|---|

- FILE FORMAT LIST

| NO | FILE FORMAT |
|---|---|
| 1 | TIFF |
| 2 | PDF |
| 3 | DOC |

- RECEIVING DESTINATION LIST OF RECEIVER

| LIST | SUMMARY INFORMATION |
|---|---|
| FIRST E-MAIL | twins@mail.net |
| FTP1 | 10.88.193.22 |
| FIRST FOLDER | ₩₩10.88.195.55₩share1 |
| SECOND E-MAIL | twins@email.com |

[DELETE]  [REVISE]  [ADD]

- RECEIVING DESTINATIONS ACCORDING TO FILE FORMATS

| NO | FILE FORMAT | LIST | PRIORITY |
|---|---|---|---|
| 1 | TIFF | FTP1 | 1 |
| 2 | | FIRST FOLDER | 1 |
| 3 | | SECOND E-MAIL | 1 |
| 4 | PDF | FIRST E-MAIL | 1 |
| 5 | | SECOND E-MAIL | 2 |
| 6 | DOC | FIRST FOLDER | 3 |
| 7 | | FTP1 | 1 |
| 8 | ETC | FIRST E-MAIL | 1 |
| 9 | | SECOND E-MAIL | 2 |

[DELETE]  [ADD]

SYSTEM AND METHOD OF DELIVERING PROCESSED IMAGE DATA TO RECEIVER USING JOB PROCESSING INFORMATION PROVIDED TO AN IMAGE FORMING APPARATUS

CROSS-REFERENCE TO RELATED APPLICATIONS

This application claims the benefit of Korean Patent Application No. 10-2007-0072470, filed on Jul. 19, 2007, in the Korean Intellectual Property Office, the disclosure of which is incorporated herein in its entirety by reference.

BACKGROUND OF THE INVENTION

1. Field of the Invention

The present general inventive concept relates to processed data delivery through an image forming apparatus such as a multifunctional peripheral (MFP) or the like. More particularly, the general inventive concept relates to a system and method of transmitting data to at least one receiver using job processing information regarding image forming jobs, by which a document receiver can set destinations according to transmitters, or on parameters or assigned job processing variables of job processing information such as document formats, so as to increase convenience to users. A client may be used to set one or more destinations corresponding to a receiver and to generate the job processing information, and the image forming apparatus may transmit the data to the destinations.

2. Description of the Related Art

A conventional workflow program is realized to generate job processing information, e.g., a work form, and to execute the work form in a multifunctional peripheral (MFP). FIG. 1 illustrates an example of a conventional user interface screen to generate job processing information. As illustrated in FIG. 1, a conventional workflow program has a problem in that a reception destination of a document is generated by a work form generator, and thus a receiver cannot select a desired reception destination of the document. In addition, destination information of receivers must be accurately entered to correctly generate the work form, and it is difficult to obtain information regarding the receivers due to security reasons.

SUMMARY OF THE INVENTION

The present general inventive concept provides a method and an apparatus to designate a destination of a document receiver and to transmit data to the document receiver without detailed information regarding the document receiver when image processing information of image forming jobs, e.g., a work form, is generated.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept are achieved by providing a method of transmitting data to at least one receiver using job processing information during image forming jobs, including setting one or more destinations corresponding to the receiver, generating job processing information corresponding to information of the receiver excluding a specific destination to which jobs are to be transmitted, and transmitting an image formed in accordance with the generated job processing information to the one or more destinations corresponding to the receiver according to at least one value in the generated job processing information.

The foregoing and/or other aspects and utilities of the present general inventive concept are also achieved by providing a client to input job processing information of an image processing apparatus including a setup controller controlling to set one or more destinations corresponding to a receiver and to generate the job processing information to include address information of the destination of the receiver to which jobs are to be transmitted, and a user interface unit controlled by the setup controller to provide a dialogue window to set the one or more destinations corresponding to the receiver and a dialogue window to generate the job processing information.

The foregoing and/or other aspects and utilities of the present general inventive concept are also achieved by providing an image forming apparatus including a user interface unit to receive selection information to execute jobs from a user, an image forming apparatus interface unit to receive job processing information including information regarding a receiver that is a destination to which jobs are to be transmitted, and an execution controller to control execution of the job processing information, wherein the image forming apparatus interface unit transmits results of the execution of the job processing information to the destination.

The foregoing and/or other aspects and utilities of the present general inventive concept are also achieved by providing system to deliver images processed by an image processing apparatus to receivers. A client generates image processing job information according to values assigned to image processing job variables, where the generated image processing job information excludes a destination address to which a processed image is to be delivered. A server stores the image processing job information and at least one destination address of at least one of the receivers corresponding to a value assigned to at least one of the job variables. An image processing apparatus transmits an image processed in accordance with the image processing job variables to the at least one destination.

The foregoing and/or other aspects and utilities of the present general inventive concept are also achieved by providing an image forming apparatus having a user interface unit to be manipulated by a user to select image processing job information, thereby selecting a destination of a receiver corresponding to a parameter set in the job processing information. A controller executes an image processing job in accordance with the selected image processing job information, and an interface delivers the image processing job executed by the controller to the selected destination of the receiver.

The foregoing and/or other aspects and utilities of the present general inventive concept are also achieved by providing a method of delivering a processed image forming job to at least one receiver. The method includes associating at least one destination address of the receiver with a respective at least one value of a variable of the image forming job, processing the image forming job in accordance with assigned variables contained therein, and transmitting the processed image forming job to the destination address associated with the at least one value assigned to the variable of the image forming job.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which:

FIG. 3 is a flowchart illustrating a method of transmitting data to each of a plurality of receivers using job processing information regarding image forming jobs according to an embodiment of the present general inventive concept;

FIG. 4 illustrates a user interface screen to classify and set job receiving destinations according to transmitters according to an embodiment of the present general inventive concept;

FIG. 5 illustrates a user interface screen to classify and set job receiving destinations according to file formats according to an embodiment of the present general inventive concept;

DETAILED DESCRIPTION OF THE PREFERRED EMBODIMENTS

Figure 1:
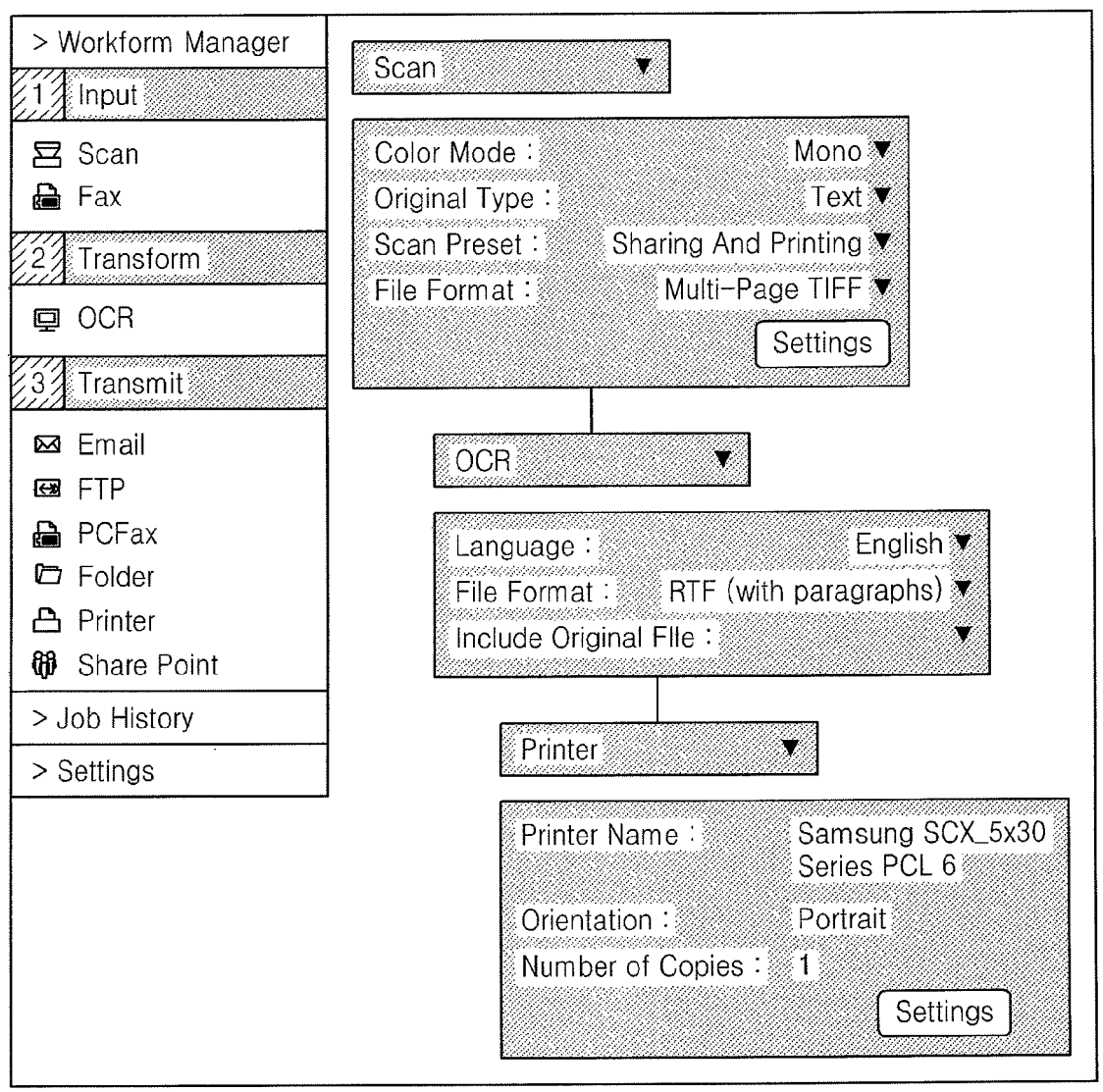
FIG. 1 illustrates an example of a conventional user interface screen to generate job processing information.

An exemplary method of performing a transmission with respect to each of a plurality of receivers using job processing information specifying image forming jobs according to the present general inventive concept will now be described in detail with reference to the attached drawings, wherein like reference numerals refer to like elements and operations throughout. It is to be understood that the term "image," as used herein, is intended to encompass text documents, photographs, diagrams, and any other object that can be processed, rendered, printed, and/or transmitted by an applicable image forming apparatus. Additionally, it is to be understood that the term "transmitter" refers to an entity sending an image processing job to an image forming apparatus, and the term "receiver" refers to an entity to which a completed image forming job, i.e., an image as defined above, is to be delivered by the image forming apparatus. The term "receiver destination" and variants thereof, refers to a specific location associated with the receiver to which the image is to be transmitted. The exemplary embodiments are described below to explain the present general inventive concept by referring to the figures.

Figure 2A:
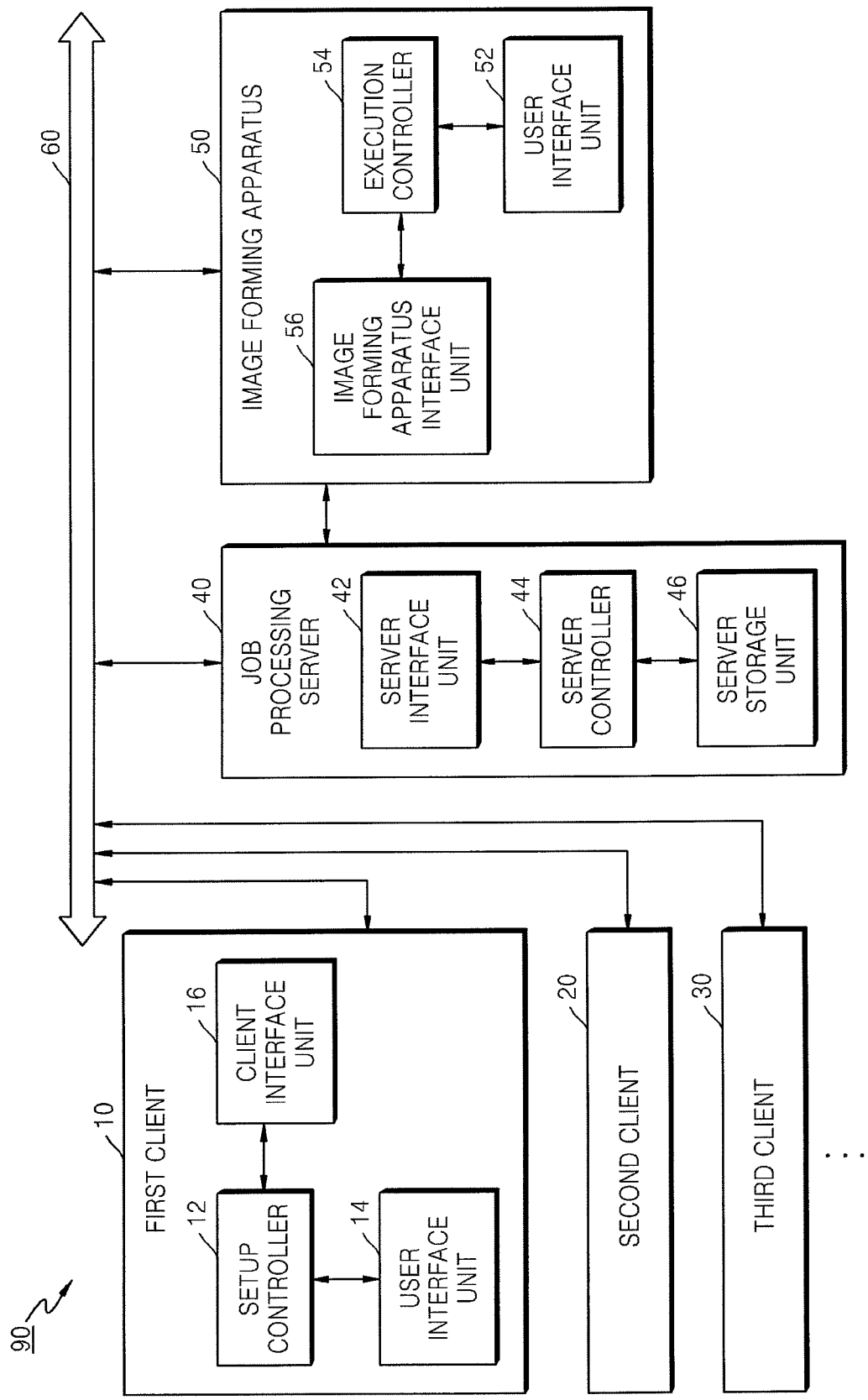
FIGS. 2A and 2B are block diagrams illustrating exemplary system configurations of clients, an image forming apparatus, and servers according to embodiments of the present general inventive concept.
Figure 2B:
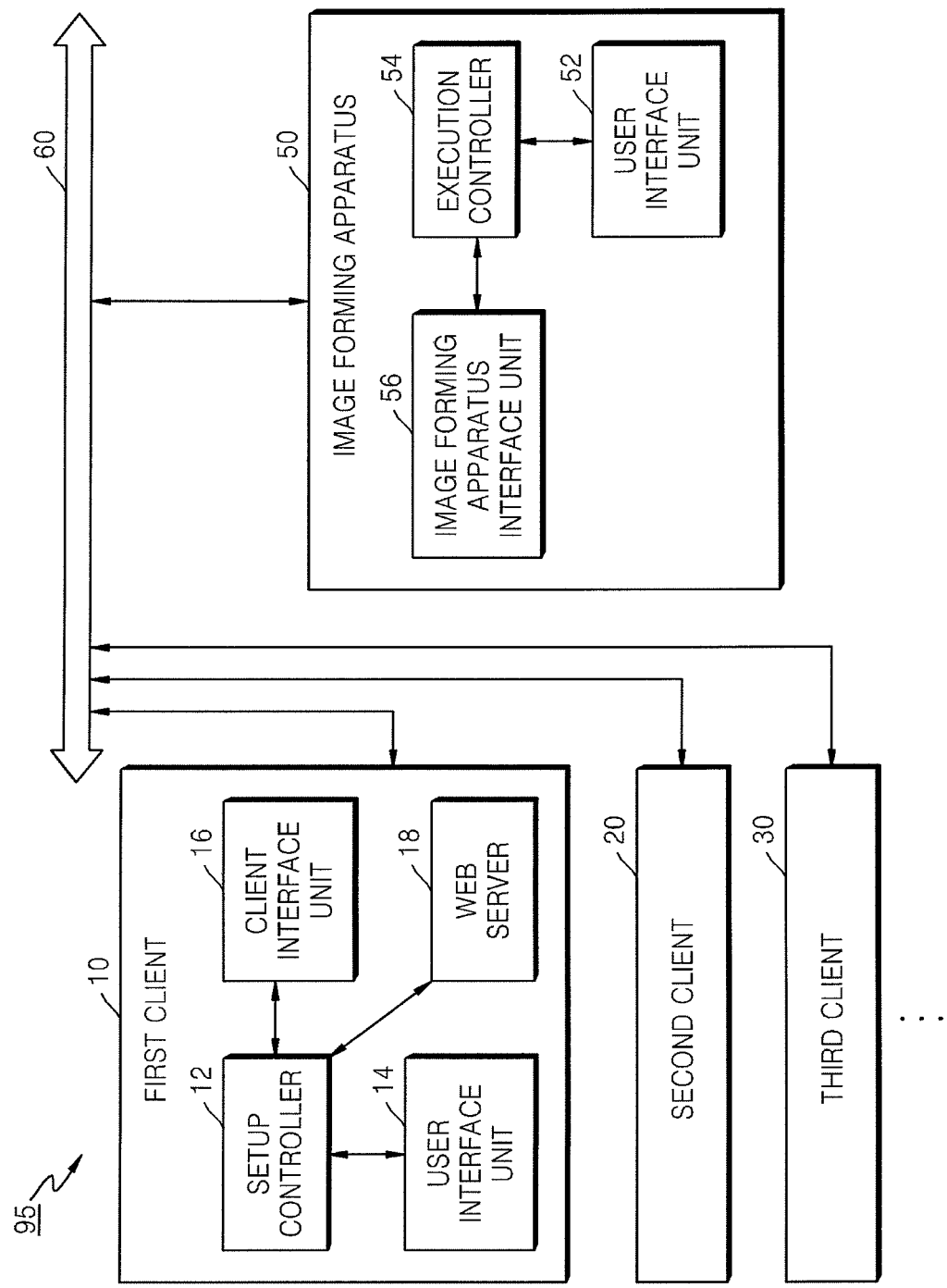

FIGS. 2A and 2B illustrate exemplary system configurations suitable to practicing the present general inventive concept. FIG. 2A is a block diagram illustrating a first image delivery system 90 having first, second, third clients 10, 20, and 30, an image forming apparatus 50, and a job processing server 40, according to an exemplary embodiment of the present general inventive concept. FIG. 2B is a block diagram illustrating a second image delivery system 95 having first, second, and third clients 10', 20', and 30', having similar components as clients 10, 20 and 30, but system 95 implements an alternate server configuration, as will be described below. The clients 10, 20, and 30, and 10', 20', and 30', may be implemented in software, hardware, or both, such as through a collection of software routines on a computing apparatus. As used herein, the term, "client," is intended to mean the combination of hardware and software components implementing the client functionality described below, and the term "server," is intended to mean the combined hardware and software components implementing the functionality of the server.

In FIGS. 2A and 2B, three clients are illustrated, but the present general inventive concept is not limited thereto. The second and third clients 20 and 30, and 20' and 30', and any additional clients, operate in a manner similar to that of the first client 10 and may include the same elements as those of the first client 10. The elements of the first client 10 will be described hereinafter, and a detailed description of the additional clients will be omitted in the interest of brevity.

The exemplary first client 10 sets one or more destinations corresponding to a receiver and may include a setup controller 12, a user interface unit 14, and a client interface unit 16.

The exemplary setup controller 12 controls the setting of the one or more destinations associated with the receiver according to values assigned to variables of the image processing job. The job processing variables are those used to control execution of image forming jobs in accordance with user requirements, including the receipt of the image forming job by, and transmission of the completed image forming job to the image forming apparatus. The setup controller 12 may set the receiver's destinations according to a value, i.e., the identifier of each of a plurality of transmitters, assigned to a transmitter job variable. The setup controller 12 may also assign priorities to the destinations associated with the receiver. Information regarding a list of known transmitters and the reception destinations of a receiver may be pre-stored in a predetermined storage space, such as in suitable lookup tables in the server storage unit 46 of the job processing server 40. It is to be understood that other storage locations for static data, such as receiver lists, transmitter lists, file format lists (described below), etc. may be used with the present general inventive concept without departing from the spirit and intended scope thereof. The setup controller 12 may set the one or more receiving destinations according to each transmitter based on the information in the lookup table. Additionally, the setup controller 12 may also assign priorities to each of the receiving destinations for any value of a variable, such as the transmitter job variable, so that the processed image may be transmitted to a destination having the next highest priority if transmission to a destination having a higher priority cannot be completed.

Alternatively, the setup controller 12 may set the receiver's associated destinations according to a file format job variable. The setup controller 12 may assign priorities to the destinations of the receiver associated with the file format. To set the destinations according to file formats, a list of known file formats and a list of receiving destinations of each of a plurality of receivers may be pre-stored in a predetermined storage space, such as in suitable lookup tables in the server storage unit 46 of job processing server 40. The setup controller 12 sets the receiving destinations according to the file format based on information in the list of file formats and the list of receiving destinations maintained in the lookup table. In a manner similar to that described above, priorities associated with the receiving destinations may be assigned to different values of the file format variable.

It is to be understood that the present general inventive concept is not limited to associating receiver destinations with values of the transmitting job variable and the file format job variable. The receiver destinations may also be associated with other image processing job variables based on the capabilities of the image forming apparatus being used.

The exemplary setup controller 12 generates job processing information including information regarding a receiver as a destination to which jobs are to be transmitted. Here, the job processing information refers to formatted data, such as a work form than can be used to execute image forming jobs in accordance with the values assigned to the job processing variables. The job processing information generated by the setup controller 12 of the present general inventive concept includes information regarding a name of a receiver, as opposed to specific destination information, such as a network address of the receiver, an e-mail address of the receiver, a specific folder to which the processed job data is to be delivered, a facsimile telephone number, etc. Thus, a user need only input the name of the receiver to specify a destination that is to receive the information, and the job processing information including the name of the receiver is generated accordingly by the setup controller 12.

The exemplary user interface unit 14 allows a user to associate the receivers with one or more corresponding destinations. For example, the user interface 14 may receive a signal from the setup controller 12 to display a first dialogue window to allow the user to set receiver destinations. In certain embodiments of the present general inventive concept, the user interface unit 14 may display the first dialogue window to set the destinations associated with a receiver according to each value of the transmitter job variable. The user interface unit 14 may also display a second dialogue window to assign priorities to the destinations for each value of the transmitter job variable. The user interface unit 14 may also display a third dialogue window to set the receiver's destinations according to each value of the file format job variable. It is to be understood that, in a manner similar to that just described, other dialogue windows may be implemented to associate a receiver destination with values of other job processing variables.

The exemplary user interface unit 14 displays a fourth dialogue window that allows a user to assign values to other job processing variables that define the image produced by the image forming apparatus 52. Once the user assigns values to the job processing variables through the fourth dialogue window, the setup controller 12 generates corresponding job processing information based on the input job processing variables.

In the exemplary embodiment of the system 90 of FIG. 2A, the client interface unit 16 transmits information regarding the destinations associated with the receiver and the generated job processing information to the job processing server 40. The job processing server 40 may include a server interface unit 42 to communicate with other components in the system 90 over a communication channel 60. The job processing server 40 may also include a server controller 44 to conduct the control operations of the job processing server 44, and a server storage unit 46, to store, among other things, various lookup tables, the job processing information, and the receiver destination information transmitted to the job processing server 40.

The exemplary job processing server 40 receives the information regarding the destinations associated with the receiver from the first client 10 and stores the information in, for example, the server storage unit 46. The job processing server 40 may also receive the job processing information from the first client 10, may store the job processing information, and may generate detailed information corresponding to the job processing information received from the first client 10. Thus, the client 10 transmits the destinations associated with a receiver and the generated work form data to the job processing server 40, and the detailed job processing information generated by the job processing server 40 includes the receiver destination associated with the corresponding values of the applicable job processing variable.

FIG. 2B illustrates another embodiment of an image job processing system 95, wherein the first client 10 includes an internal web server 18. When so embodied, the client interface unit 16 may transmit the information regarding the destinations corresponding to the receiver and the generated job processing information to the internal web server 18. The web server 18 may provide information over the communications channel 90 upon request, such as through suitable hyper-text transfer protocol (HTTP) commands. The web server 18 may use resources of the client 10', such as processor time and memory space, to function in a manner similar to the job processing server 40 for the client 10'. The detailed description that follows will be that using the job processing server 40, where the implementation details of the present general inventive concept using a web server 18 will be apparent to the skilled artisan.

When a user approaches and operates the image forming apparatus 50 to perform jobs, the image forming apparatus 50 accesses the job processing information in the job processing server 40, and executes the job processing information, wherein the job processing information includes the information regarding the receiver that is a destination to which jobs are to be transmitted. The image forming apparatus 50 may transmit the processed job in accordance with the execution of the job processing information to the destinations associated with the receiver. In certain embodiments of the present general inventive concept, the image forming apparatus 50 may include a user interface unit 52, an execution controller 54, and an image forming apparatus interface unit 56.

The exemplary user interface unit 52 accepts selection information from the user to execute the jobs. For example, the user may input a job execution command through a dialogue window of the user interface unit 52.

The exemplary execution controller 54 formats a request to obtain a list of job processing information of users of the job processing server 40 responsive to the job execution command input through the user interface unit 52. Alternatively, the execution controller can format a request to obtain the job processing information from the web server 18 at each client 10-30. Once the list of job processing information is received from the job processing server 40 through the image forming apparatus interface unit 56, the execution controller 54 formats a request to obtain detailed information of job processing information from the job processing server 40, or the web server 18 of each client 10-30, wherein the job processing information is selected from the list through the user interface unit 52. The job processing server 40 generates the requested detailed information of the job processing information and transmits the detailed information to the image forming apparatus 50 over the communication channel 60. Here, the detailed information includes complete addresses of the destinations (e.g., an e-mail address, a network address of a specific folder, facsimile telephone number, etc.) of a receiver corresponding to the requested job processing information. The execution controller 54 controls execution of the detailed information received through the image forming apparatus interface unit 56. The execution controller 54 transmits the image obtained from the execution of the detailed job processing information to corresponding destinations through the image forming apparatus interface unit 56. Here, if a transmission error occurs during the transmission of the results to the destinations corresponding to the receiver, the execution controller 54 controls the transmission of the image to a destination having the next highest priority according to the respective priorities assigned to the destinations.

The image forming apparatus interface unit 56 receives the job processing information including the information regarding the receiver destination to which jobs are to be transmitted, and transmits the processed image resulting from the execution of the job processing information to the destinations.

A method of transmitting data to each of a plurality of receivers using job processing information generated from processing job variables of image forming jobs, according to an embodiment of the present general inventive concept, will now be described in detail with reference to FIGS. 2A through 7.

FIG. 3 is a flowchart illustrating an exemplary method of transmitting data to each of a plurality of receivers using job processing information regarding image forming jobs, according to an embodiment of the present general inventive concept.

In operation 100, one or more destinations corresponding to a receiver are set.

For example, the one or more destinations can be classified and set according to values of the transmitter job variable.

FIG. 4 illustrates an exemplary user interface screen to classify and set job receiving destinations according to transmitters, in accordance with an embodiment of the present general inventive concept. Referring to FIG. 4, a transmitter list and a receiving destination list of each of a plurality of users may be pre-stored, such as in the server storage unit 46 of the job processing server 40. Thus, receiving destinations can be set according to transmitters by associating values in the transmitter list with values in the receiving destination list, as illustrated in FIG. 4. The priorities of receiving destinations can be set so as to transmit to a receiving destination having the next highest priority if transmission to a receiving destination having a higher priority cannot be completed.

The destinations corresponding to the receiver may also be classified and set according to the file format job variable.

FIG. 5 illustrates an exemplary user interface screen to classify and set job receiving destinations according to file formats, in accordance with an embodiment of the present general inventive concept. Referring to FIG. 5, a file format list and a receiving destination list of each of a plurality of users may be pre-stored, such as in the server storage unit 46 of the job processing server 40. Thus, receiving destinations can be set according to file formats by associating values in the file format list with values in the receiving destination list, as illustrated in FIG. 5. Here, priorities of receiving destinations can be set so as to transmit the image to a receiving destination having a next highest priority if a transmission to a receiving destination having a higher priority cannot be completed.

Information regarding the one or more destinations set in operation 100 is transmitted to and stored in a job processing server or an internal web server. The job processing server interfaces image forming jobs between a client and an image processing apparatus, such as a multifunctional peripheral (MFP). The internal web server may be installed in the client to provide web services to obtain the information requested by the image processing apparatus.

In operation 102, job processing information including information regarding the receiver is generated, wherein the receiver destination to which jobs are to be transmitted is included in the job processing information. Here, the job processing information may be as formatted data, for example, a work form generated from assigned job processing variables, to control the way in which image forming jobs are executed.

Figure 6:
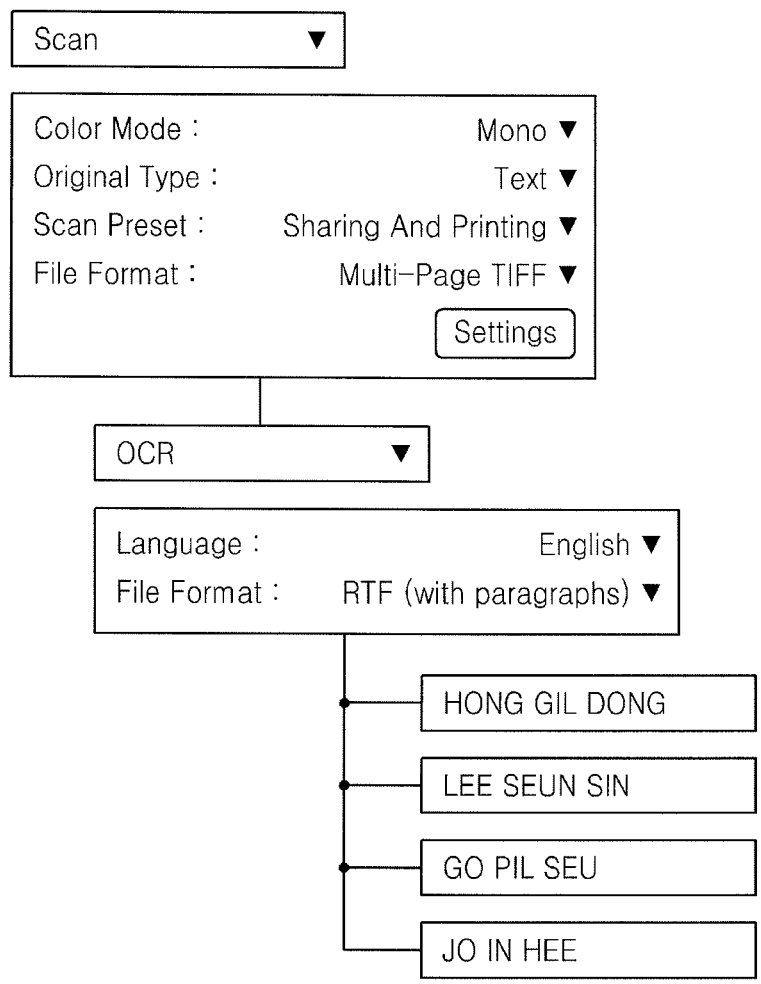
FIG. 6 illustrates a user interface screen to explain an operation of the method of FIG. 3 according to an embodiment of the present general inventive concept.

FIG. 6 illustrates a user interface screen to explain operation 102 of the method of FIG. 3, according to an embodiment of the present general inventive concept. Referring to FIG. 6, in a departure from conventional job processing information, job processing information of the present general inventive concept provides means, such as a user interface screen, through which identifiers of receivers, such as the names thereof (e.g., Hong Gil Dong, Lee Seun Sin, Go Pil Seu, Jo In Hee) can be input without the user having to set detailed network addresses of the receivers, e.g., e-mail addresses of the receivers, destination information regarding specific folders that are to receive the processed data, etc. A user inputs only the names of the receivers (e.g., Hong Gil Dong, Lee Seun Sin, Go Pil Seu, Jo In Hee) as receiving destinations. In operation 102, job processing information including the names of the receivers input by the user is generated.

The job processing information generated in operation 102 may be transmitted to and stored in the job processing server 40.

When the user approaches and operates the image forming apparatus 50 after operation 102, in operation 104, the image forming apparatus 50 accesses the job processing information from the job processing server 40, executes the job processing information, and transmits the image obtained from the execution of the job processing information to destinations corresponding to the receivers.

Figure 7:
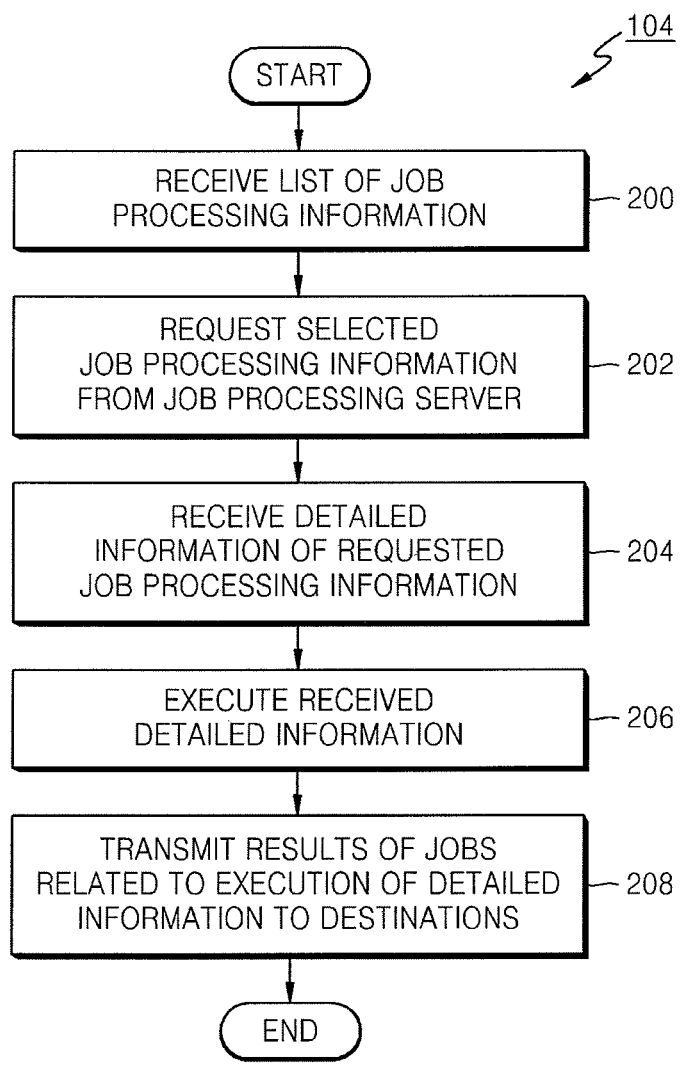
FIG. 7 is a flowchart illustrating an operation of the method of FIG. 3 according to an embodiment of the present general inventive concept.

FIG. 7 is a flowchart illustrating operation 104 of the method of FIG. 3, according to an embodiment of the present general inventive concept.

In operation 200, the execution controller 54 receives a list of job processing information of receivers from the job processing server 40. Here, the list of job processing information includes information related to names of the receivers corresponding to the job processing information. A user of the image forming apparatus 50 can select from the names of the receivers in the list to specify the receivers to which jobs are to be transmitted.

In operation 202, job processing information selected from the list by the user is requested from the job processing server 40. Responsive to the user selecting job processing information corresponding to receivers to which jobs are to be transmitted, the execution controller 54 requests the selected job processing information from the job processing server 40.

In operation 204, the detailed information of the requested job processing information is received from the job processing server 40. If the job processing server 40 receives a request from the execution controller 54 of the image forming apparatus 50 to provide specific job processing information, the job processing server 40 generates detailed information indicating detailed destinations of receivers (e.g., e-mail addresses, network addresses of specific folders, etc.) corresponding to the requested job processing information. The detailed information is then transmitted to the image forming apparatus 50.

In operation 206, the detailed information is executed. The execution controller 54 executes the detailed information to output job results desired by the user.

In operation 208, the execution controller 54 transmits the completed image to destinations corresponding to the receivers. Here, if a transmission error occurs during the transmission of the job results to the destinations, the execution controller 54 transmits the job results to a destination having the next highest priority in the hierarchy of priorities assigned to the destinations.

As described above, in a method of transmitting data to each of a plurality of receivers using job processing information regarding image forming jobs, a client to set one or more destinations corresponding to a receiver and generating the job processing information, and an image forming apparatus to transmit data to the destinations, according to the present general inventive concept, specific and detailed locations of receivers receiving a document can be designated by a user using only names of the receivers when processing information of the image forming jobs, e.g., a work form, is generated. Also, destinations can be designated according to, among other things, transmitters or document formats to increase convenience of users.

Therefore, a work form generator can generate a work form using only broadly-specified information regarding the receivers, without specific information regarding destinations. Also, the destination information of the receivers can be transparent to the work form generator, and thus privacy can be protected. In addition, if the destination information of the receivers is changed after the work form is generated, the receivers can revise the destination information without having to revising the work form. Moreover, the destinations can be set according to job variables of the work form, such as transmitters or file formats, and thus transmitted files can be easily managed. Furthermore, the receivers can give priorities to the destinations. Thus, even if errors occur during transmission, the transmission can be completed by transmitting to different destinations.

The general inventive concept can also be embodied as computer readable codes on a computer readable recording medium. The computer readable recording medium may be embodied in any data storage device that can store data and can be thereafter be read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments to embody various features the present general inventive concept can be easily constructed by programmers skilled in the art to which the present general inventive concept pertains.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of transmitting data to at least one receiver destination among a plurality of different types of receiver destinations using a job processing information regarding an image forming job, comprising:
    setting, using at least one processor, a specific receiver destination among the plurality of different types of receiver destinations corresponding to a single receiver to which data is to be transmitted according to a transmitter of the image forming job or a file format of the image forming job;
    generating the job processing information, using at least one processor, including a name of the single receiver but excluding the specific receiver destination such that the specific receiver destination is transparent so as to provide privacy, and information regarding the at least one receiver destination corresponding to the single receiver and the generated job processing information are stored in an internal web server; and
    transmitting an image formed in accordance with the generated job processing information to the specific receiver destination corresponding to the single receiver by referring to the name of the single receiver included in the job processing information.

2. The method of claim 1, wherein transmission priorities of the at least one receiver destination are set.

3. The method of claim 1, wherein information regarding the at least one receiver destination corresponding to the single receiver and the generated job processing information are stored in a job processing server.

4. The method of claim 1, wherein the transmission of the image comprises:
    receiving a list of the job processing information;
    selecting the job processing information from the list of job processing information;
    receiving detailed information of the requested job processing information, the detailed information including at least one specific receiver destination corresponding to the single receiver;
    executing an image forming job in accordance with the detailed information to form an image; and
    transmitting the image formed in accordance with the executed image forming job to the at least one specific receiver destination corresponding to the single receiver.

5. The method of claim 4, wherein the list of job processing information comprises information regarding the single receiver corresponding to the job processing information and excludes information of at least one specific receiver destination.

6. The method of claim 4, wherein, if a transmission error occurs during the transmission of the image to the at least one specific receiver destination, the image is transmitted to another of the at least one specific receiver destination having next highest priority in the priorities of the at least one specific receiver destination.

7. A non-transitory computer-readable recording medium having embodied thereon computer instructions executable by a control module to perform the method of claim 1.

8. A method of delivering a processed image forming job to a plurality of different types of receivers comprising:
    associating a destination address corresponding to a specific destination information among a plurality of different types of receiver destinations corresponding to a single receiver among the plurality of different types of receivers according to transmitter of a processed image forming job or a file format of the processed image forming job;
    processing, using at least one processor, the image forming job in accordance with a file format job variable contained therein and excluding information of a specific receiver destination such that the specific receiver destination is transparent so as to provide privacy, where information regarding the plurality of different types of receiver destinations corresponding to the single receiver and the processed image forming job are stored in an internal web server; and
    transmitting the processed image forming job to the specific destination information associated with the transmitter of the image forming job or the file format of the image forming job.

9. The method of claim 8, further comprising:
    associating an identifier of the single receiver with the destination address thereof and with the image forming job containing the associated file format job variable; and selecting the identifier of the single receiver and thereby the image forming job corresponding thereto.

10. The method of claim 8, wherein the associating of the destination address comprises:
associating a plurality of destination addresses respectively to the at least one value assigned to the file format job variable.

11. The method of claim 10, further comprising:
associating an identifier of the single receiver with the plurality of destination addresses thereof and with the image forming job containing the file format job variable;
determining the at least one value assigned to the file format job variable in the image forming job associated with the identifier of the single receiver; and
selecting the destination address from the plurality of destination addresses associated with the at least one value assigned to the file format job variable as the destination address to which the processed image forming job is transmitted.

12. The method of claim 11, further comprising:
assigning a plurality of transmission priorities to each of the destination addresses associated with the at least one value assigned to the file format job variable.

13. The method of claim 12, wherein the transmitting of the processed image forming job includes transmitting the processed image forming job to a next destination address a next specific destination information among the plurality of different types of receiver destinations corresponding to the single receiver assigned a next highest one of the priorities when transmitting the processed image forming job to the destination address assigned, a higher one of the priorities cannot be completed.

14. The method of claim 1, wherein the specific receiver destination among the plurality of different types of receiver destinations includes a printer address, a file folder destination in a storage medium and an e-mail address.

15. The method of claim 8, wherein the specific destination information among the plurality of different types of receiver destinations includes a printer address, a file folder destination in a storage medium and an e-mail address.

* * * * *